United States Patent [19]
Castoldi et al.

[11] Patent Number: 5,999,667
[45] Date of Patent: Dec. 7, 1999

[54] METHOD FOR REDUCING REJECTS IN THE MANUFACTURE OF INTEGRATED OPTICAL COMPONENTS

[75] Inventors: Andrea Castoldi, Monza; Sergio Bosso, Assago, both of Italy

[73] Assignee: Pirelli Cavi E Sistemi S.p.A., Milan, Italy

[21] Appl. No.: 09/030,212

[22] Filed: Feb. 25, 1998

Related U.S. Application Data

[60] Provisional application No. 60/048,029, May 28, 1997.

[30] Foreign Application Priority Data

Feb. 27, 1997 [IT] Italy ................................. MI97A0425

[51] Int. Cl.⁶ .................................................. G02F 1/035
[52] U.S. Cl. ................................................................ 385/2
[58] Field of Search ................................................... 385/2

[56] References Cited

U.S. PATENT DOCUMENTS

| | | | |
|---|---|---|---|
| 3,975,631 | 8/1976 | Takeda | 250/214.1 |
| 3,998,173 | 12/1976 | Williamson et al. | 343/898 |
| 4,214,120 | 7/1980 | Jones, Jr. et al. | 439/70 |
| 5,359,449 | 10/1994 | Nishimoto et al. | |
| 5,542,009 | 7/1996 | Kuehnle | 385/7 |
| 5,600,363 | 2/1997 | Anzaki et al. | 347/237 |

OTHER PUBLICATIONS

Fukuma et al., "Optical Properties in Titanium–Diffused LiNbO₃ Strip Waveguides", J. Appl. Phys. 49(7), pp. 3693–3698, Jul. 1978.

Alferness, "Waveguide Electrooptic Modulators", IEEE Transactions on Microwave Theory and Techniques, vol. MTT–30, No. 8, pp. 1121–1137, Aug. 1982.

JP 05 333297, "Optical Waveguide Device", Patent Abstracts of Japan, (Abstract Only), Dec. 17, 1993.

JP 06 011673, "Manufacture of Optical Waveguide Device", Patent Abstracts of Japan, (Abstract Only), Jan. 21, 1994.

*Primary Examiner*—Akm E. Ullah
*Attorney, Agent, or Firm*—Finnegan, Henderson, Farabow, Garrett & Dunner, L.L.P.

[57] ABSTRACT

Method for manufacturing electrooptical components comprising an optical structure and an electrical structure on a device, comprising forming at least two optical waveguide structures on a substrate, forming an electrical structure for each optical structure on said substrate, each comprising at least one ground electrode and one signal electrode, respectively associated with said optical waveguide structures, analyzing in succession the optical characteristics of the electrooptical structures constituted by the joining together of said optical structures and said electrical structures formed in accordance with the preceding steps, and choosing one of said electrooptical structures demonstrating, upon said analysis, improved values compared to a predetermined limit; the present invention also relates to electrooptical components comprising independent and symmetrical electrooptical structures.

27 Claims, 9 Drawing Sheets

METHOD FOR REDUCING REJECTS IN THE MANUFACTURE OF INTEGRATED OPTICAL COMPONENTS

This application claims benefit of provisional application 60/048,029 filed May 28, 1997.

The present invention relates to a method for manufacturing electrooptical components formed on a substrate and to the integrated electrooptical components made with this method, for example those used in apparatus for the transmission of high-velocity optical signals in an optical communications system using optical fibers as the transmission channel.

For the purposes of the present invention, "electrooptical component formed on a substrate" is understood as a device comprising at least one optical waveguide and at least one electrode formed on said substrate, designed to perform operations of modulation, filtering, commutation and the like on an optical signal supplied to a respective optical input, by means of application of an electrical command signal supplied to a respective electrical input.

In general, for the purposes of the present invention, the electrooptical components include both components which are based on effects usually indicated as "electrooptical", for example in a birefringent material, and components in which the electrical signal applied causes an action on the optical signal, for example generating a heating action, acting on the optical signal owing to the thermooptical effect, or generating a surface acoustic wave in the substrate.

In a preferred embodiment, the invention relates in particular to an interferometric electrooptical modulator device.

During recent years, the optical communications systems which use optical signals as a communication means have rapidly become widespread; in such systems, integrated optical devices, such as, in particular, optical modulators are used.

For the transmission of data using optical carriers by means of optical modulators, a beam of coherent laser light is modulated in amplitude with a data signal and the modulated optical signal thus generated is propagated towards a remote receiver via a system of optical fibers, amplifiers, repeaters and additional signal transmission or processing components.

The beam of light may be advantageously modulated with electrical signals in the frequency range of microwaves, for example from $10^7$ to $10^{12}$ Hz, using an electrooptical modulator, such as, for example, a modulator of the Mach-Zehnder type.

An electrooptical modulator based on a Mach-Zehnder interferometer includes a monolithic substrate formed by an electrooptical material such as $LiNbO_3$ or $LiTaO_3$, or GaAs or InP (semiconductor type); polymeric (thermooptical) materials, or materials of the silica-on-silica or silica-on-silicon type may also be used.

On said substrate there is formed an optical waveguide path having a first input portion which is then divided up into two branches extending substantially parallel to one another and which join up again in an output portion; the waveguide is formed by rendering the refraction index of the material in the zone of the waveguide greater than the refraction index of the material of the substrate.

This increment in refraction index may be obtained, for example, by means of diffusion of titanium or other transition metals, or by means of proton exchange in the substrate.

On the substrate there are also formed two or more electrodes, by means of which a voltage may be applied in a section of said waveguide path.

In such a device an incoming optical signal is divided up between the branches. Ideally, in the absence of voltage applied to the electrodes, the optical signal which is propagated through the two branches is recombined in phase at the optical output of the waveguide, so that the amplitudes are additive and therefore an outgoing optical signal essentially similar to the incoming optical signal appears at the output of the device.

The application of a predetermined electrical bias voltage at the branches of the waveguide path causes, owing to the electrooptical effect, a variation between the refractive indices of the two branches, with a corresponding difference in the effective optical length of the two branches themselves. At a bias voltage known as $V\pi$, the effective optical length varies by a quantity such that the optical signals emerging from the branches are phase-shifted with respect to one another by 180°. In this condition, the signals combine in phase-opposition, providing a substantially zero output signal.

In this way, by applying a voltage-modulated electrical signal, for example between zero and $V\pi$, it is possible to impart a corresponding modulation to a continuous optical signal supplied to the input of the device.

Modulators of the type indicated above are described, for example, in IEEE Transactions on Microwave Theory and Techniques, vol. MTT-30, No. 8, August 1982, pages 1121–1137. According to similar principles thermooptical modulators may also be made.

The production of electrooptical devices of the type indicated above, for example electrooptical or thermooptical intensity modulators, with an optical waveguide of the Mach-Zehnder type, involves a sequence of processing steps starting from a substrate, using different masking levels for formation of the optical and electrical structures required.

The devices indicated are advantageously produced starting from a substrate element (wafer), on which there are formed several units, referred to below as "chips", which are then separated from one another so as to be then used in order to each form a device.

The Applicant has observed that, during the process of manufacture of integrated optical components, in particular electrooptical or thermooptical modulator devices, it is necessary to take into account a certain number of rejects, both due to defects in the optical guides, such as for example interruptions or unacceptable variations in the optical characteristics, and due to defects in the electrodes, such as for example short-circuits, and also due to mechanical deformations of the substrate and consequent breakage during the processing steps and the like.

The practical realization of the devices described above, moreover, encounters limitations due to the dimensions of the devices themselves, which are conditioned both by the size of the substrate element (called "wafer") for formation of the devices, and by the fragility of the devices formed.

According to the invention, a plurality of optical and electrical structures are formed on each device so as to have several independent units on the same device; from these, the one to be used for formation of the modulator is selected, with functionality checks, at the end of the manufacturing process.

More particularly, it has been observed that, through a combined arrangement of several units comprising optical waveguide paths and corresponding electrodes on the same device, it is possible to obtain a high production yield, without intermediate checking steps during the course of production.

According to a first aspect the present invention relates to a process for the manufacture of electrooptical components, in which an optical structure and an electrical structure are formed on a substrate, characterized in that it comprises the steps of:

defining geometrically at least one unit on an element of said substrate, said unit corresponding to a single component;

forming at least two optical structures with an optical waveguide on said unit;

forming an electrical structure for each of the said optical structures on said unit, providing an electrooptical assembly comprising an optical structure and an electrical structure which can be operationally associated with one other;

separating said unit from said substrate element;

analyzing the functional characteristics of each of said electrooptical assemblies in said units; and selecting one of said electrooptical assemblies demonstrating, upon analysis, improved values compared to a predetermined limit of at least one of said functional characteristics.

Preferably, a plurality of units are defined on said substrate element.

Preferably each of said electrical structures comprises at least one ground electrode and one signal electrode.

In a particular embodiment, two of said electrical structures on the same unit have a common ground electrode.

Preferably said substrate is made of a material chosen from $LiNbO_3$ or $LiTaO_3$, GaAs, InP, Si, $SiO_2$ and a polymer material with low optical attenuation.

More preferably said substrate is made of $LiNbO_3$. In a particular embodiment said electrooptical assembly comprises a Mach-Zehnder interferometric structure.

In a preferred form, said step of forming at least two optical structures with an optical waveguide on said unit comprises forming at least two optical waveguides in said substrate by means of photolithography through a mask for optical structures.

Preferably, said optical waveguides are formed by means of diffusion of titanium.

According to an alternative, said optical waveguides are formed by means of proton exchange.

In a preferred embodiment of the method according to the invention, said step of forming at least one electrical structure for each of said optical structures on said unit comprises forming at least one electrode on said substrate by means of deposition of a conductive metal layer by means of photolithography through a mask for electrical structures.

Preferably, said electrical structures have ends accessible for the supplying of electrical signals by means of electrical contact, being aligned on one side of said unit, and said optical waveguides have at least one end accessible for the supplying of optical signals by means of optical coupling, said accessible ends of each electrooptical assembly being in a predefined relative position.

In particular the method according to the invention comprises forming on each unit two independent and opposite electrooptical assemblies having a symmetry with respect to a rotation of 180° about the central axis perpendicular to the surface of the unit, each having ends of the electrical structures arranged on one side of the device, so that they may be connected to a plurality of external connectors.

According to another aspect, the present invention relates to an electrooptical component comprising:

a substrate, at least one optical waveguide structure on said substrate, designed to allow the passage of an optical signal, at least one electrical structure comprising a plurality of electrodes located in the vicinity of and operationally associated with said optical waveguide structure, designed to receive an external electrical signal, characterized in that it comprises at least two electrooptical assemblies formed by an optical structure and an electrical structure which are operationally associated with one another.

Preferably each of said electrical structures comprises at least one ground electrode and one signal electrode.

Preferably two of said electrical structures on the same unit have a common ground electrode.

Preferably said substrate is made of a material chosen from $LiNbO_3$, $LiTaO_3$, GaAs and InP, Si, $SiO_2$ and a polymer material with low optical attenuation; more preferably said substrate is made of $LiNbO_3$.

Preferably said electrical structures have ends accessible for the supplying of electrical signals by means of electric contact, being aligned on one side of said units, and said optical waveguides have at least one end accessible for the supplying of optical signals by means of optical coupling, said accessible ends of each electrooptical assembly being in a predefined relative position.

In a preferred embodiment the electrooptical component according to the present invention comprises two independent and opposite electrooptical assemblies having a symmetry with respect to a rotation of 180° about the central axis of the unit, each having ends of the electrical structures arranged on one side of the device, so as to be able to be connected to a plurality of external connectors.

In a particular embodiment, the present invention relates to an electrooptical component comprising an electrooptical modulator, in which said signal electrodes comprise a bias electrode designed to receive a signal for control of the working point of the modulator, and a drive electrode designed to receive a radiofrequency signal for driving of the modulator.

In particular, said electrooptical component is an interferometric electrooptical modulator device which comprises at least two independent electrooptical assemblies, each comprising at least one optical structure and at least one electrical structure which are operationally connected, said electrical structure including at least one signal electrode and at least one ground electrode, where each of said electrical structures has ends arranged on a respective side of the device in predetermined positions with respect to said side, a predetermined angle of rotation of the device being defined such that said ends of two electrooptical assemblies are arranged in the same predetermined positions.

More particularly, said electrooptical component is an interferometric electrooptical modulator device comprising a first and a second Mach-Zehnder structure comprising pairs formed by said optical structure and by said electrical structure, being located opposite one another and symmetrical with respect to an axis passing through the surface of the device, forming two independent electrooptical modulators having a symmetry with respect to a rotation of 180° about said axis, each modulator having ends of the electrical structures arranged on one side of the device so that they may be connected to respective external connectors, where by means of a first or a second rotation of 180° of the device said first or said second modulator is respectively connected to said connectors.

Further details will emerge from the following description, with reference to the accompanying drawings, in which.

Figure 6:
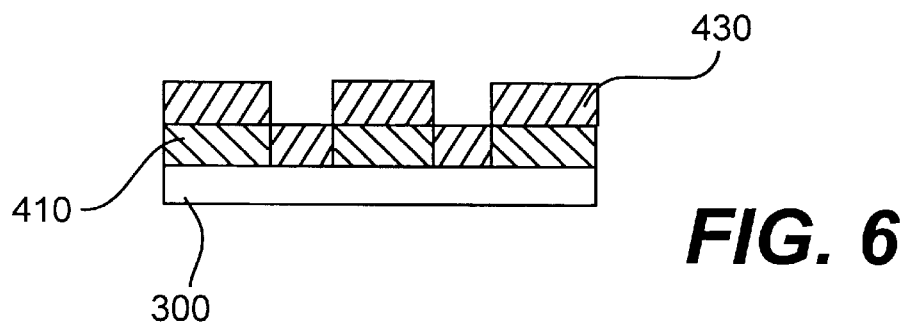
Figure 7:
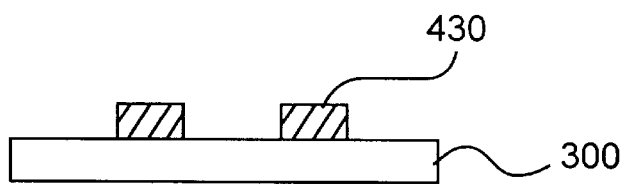
Figure 8:
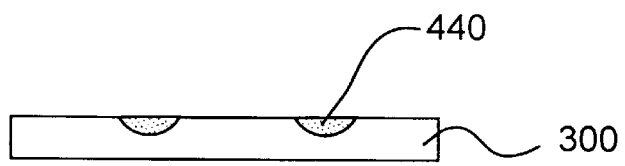
Figure 11:
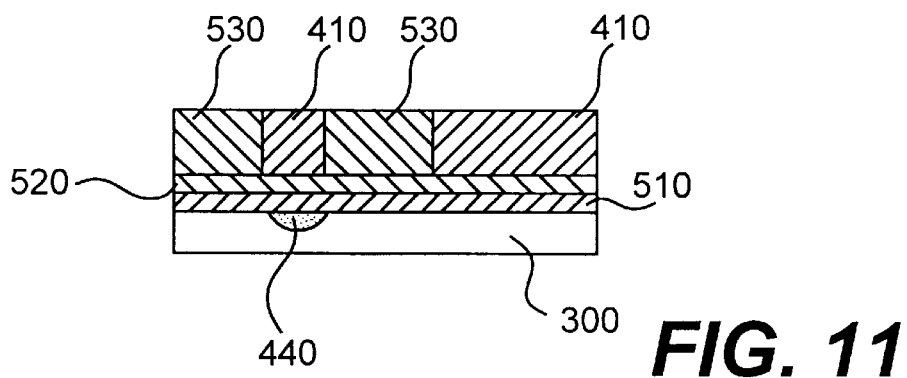
Figure 12:
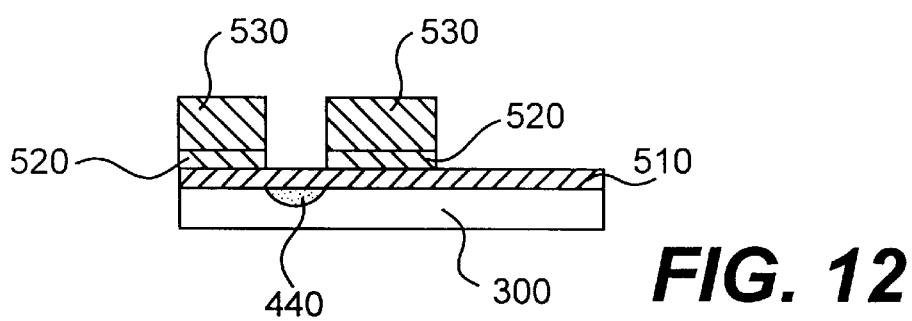
Figure 13:
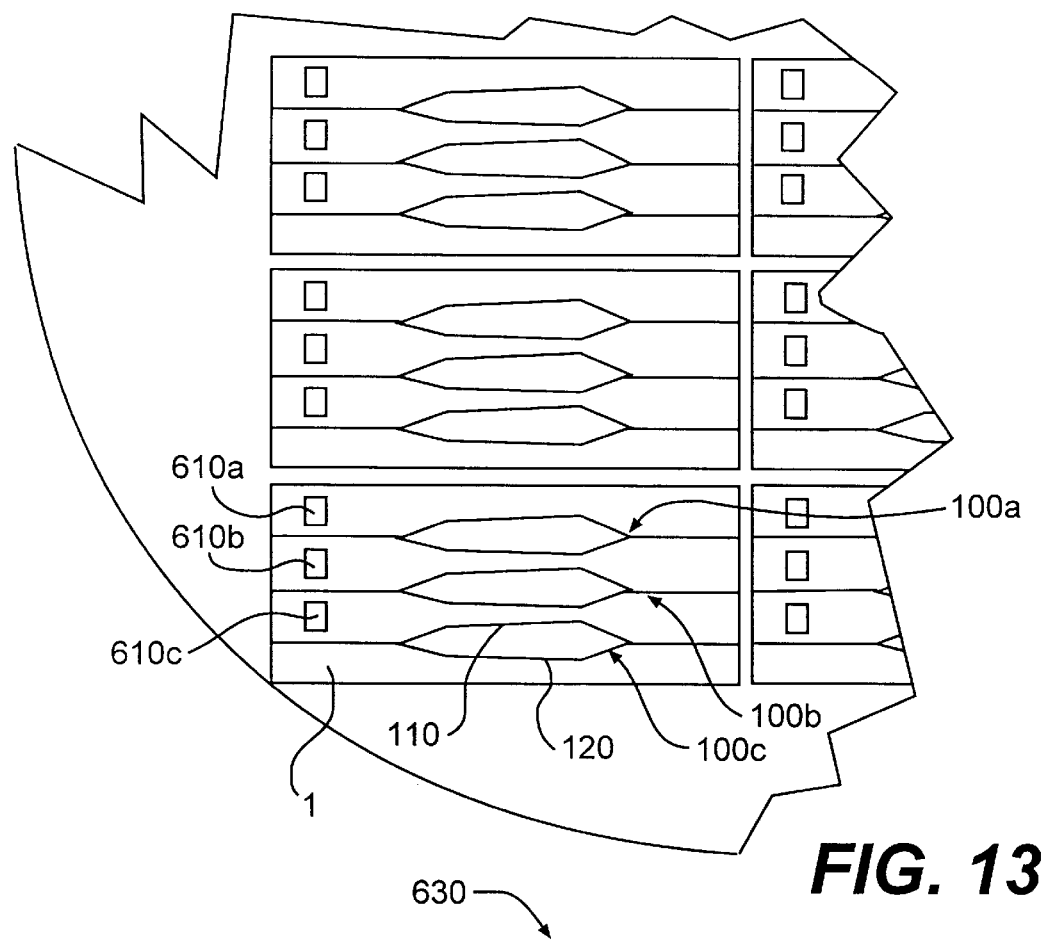
Figure 14:
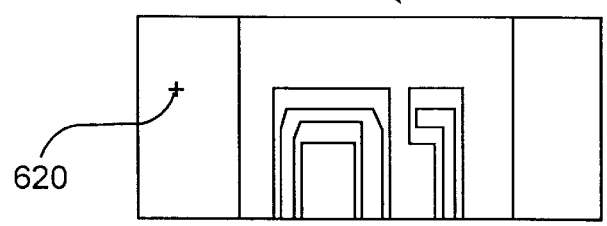
Figure 15:
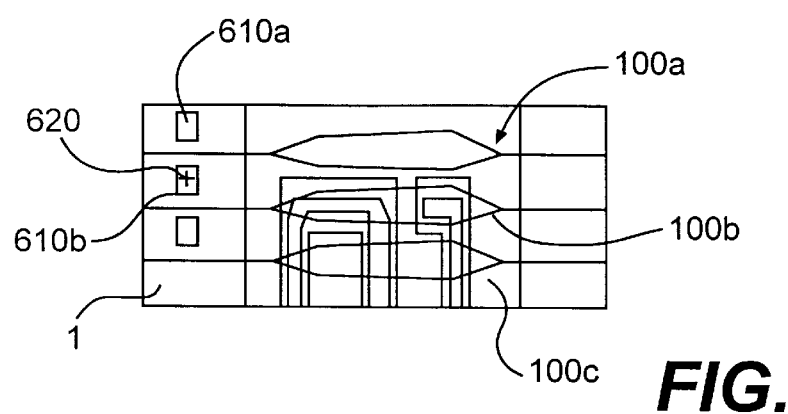
Figure 16:
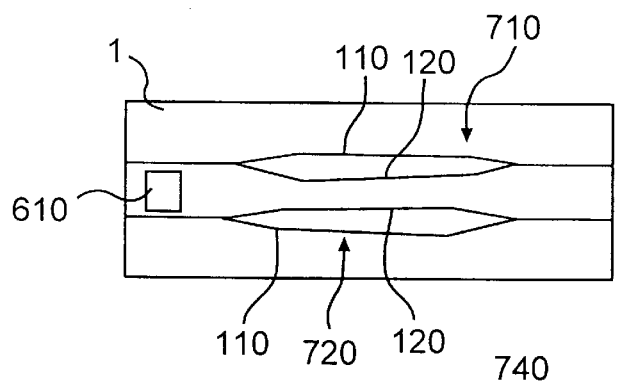
Figure 17:
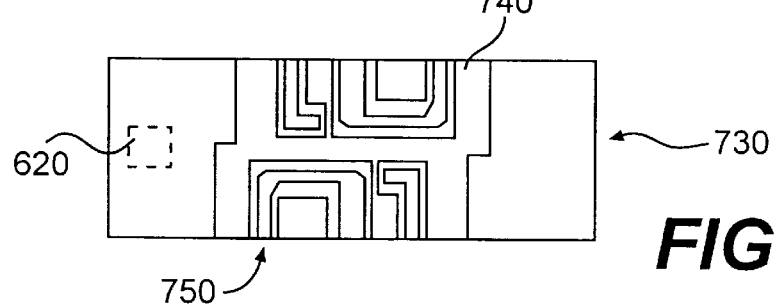
Figure 18:
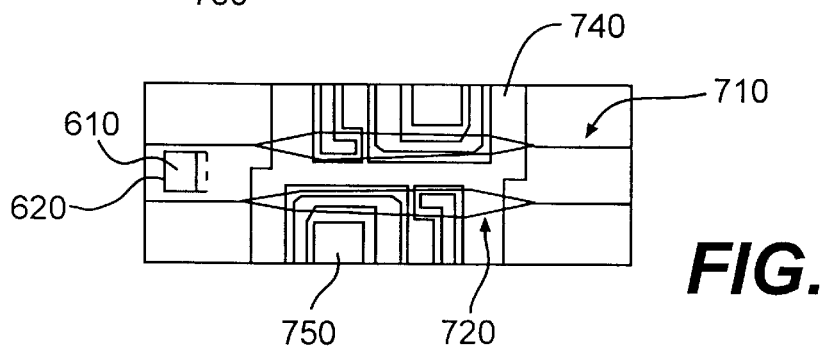
Figure 19:
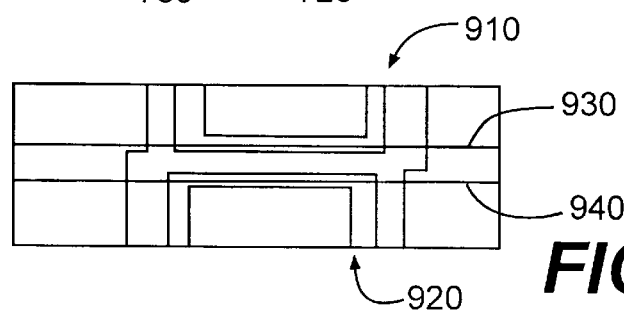
Figure 20:
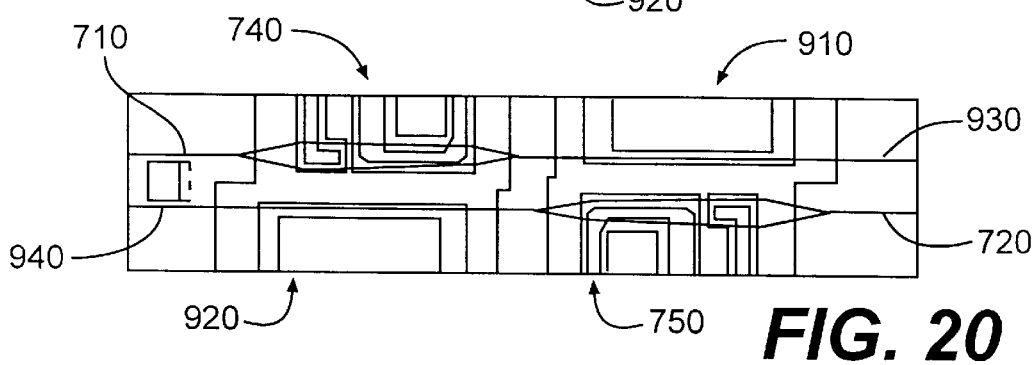
Figure 21:
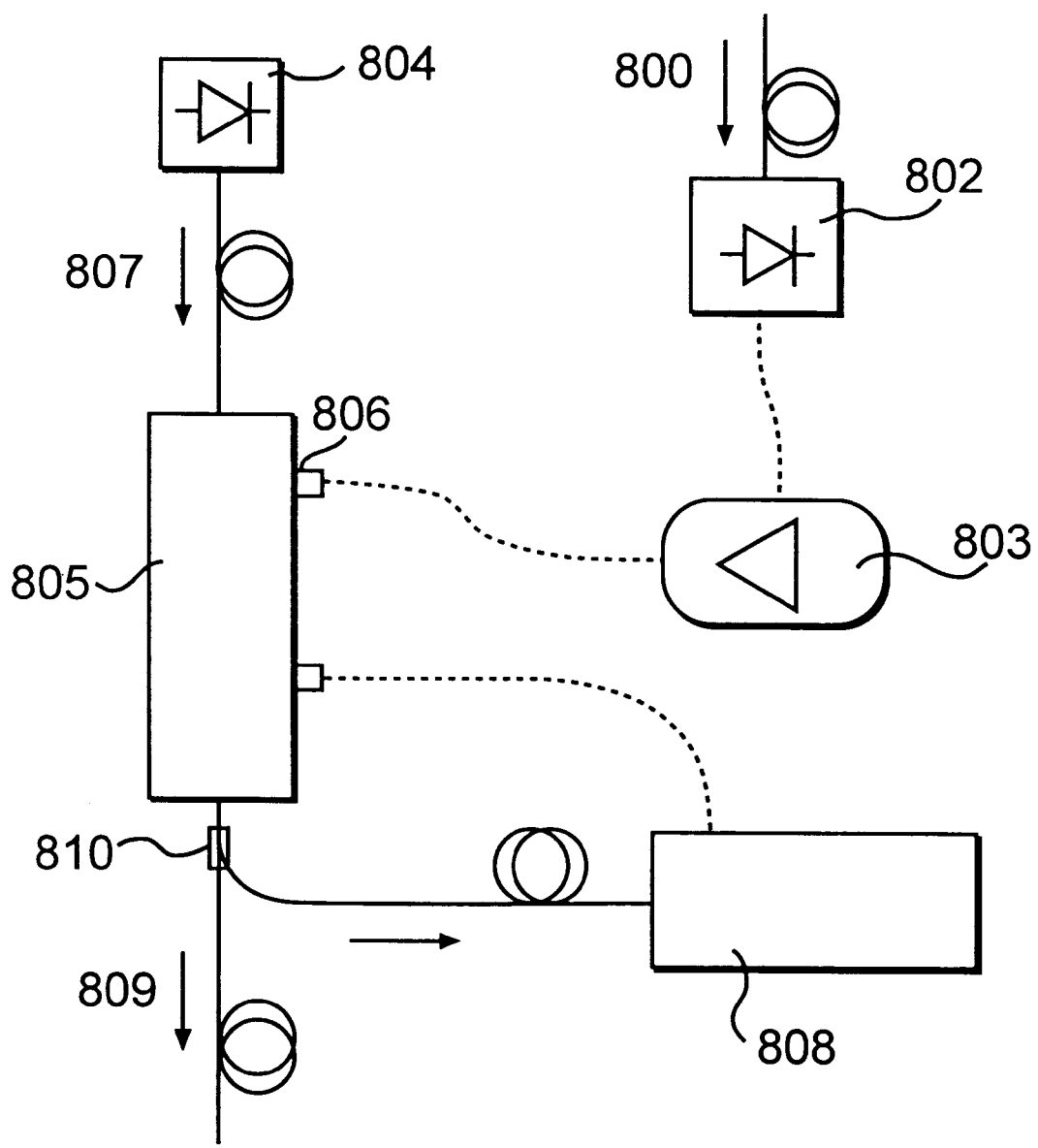
Figure 22:
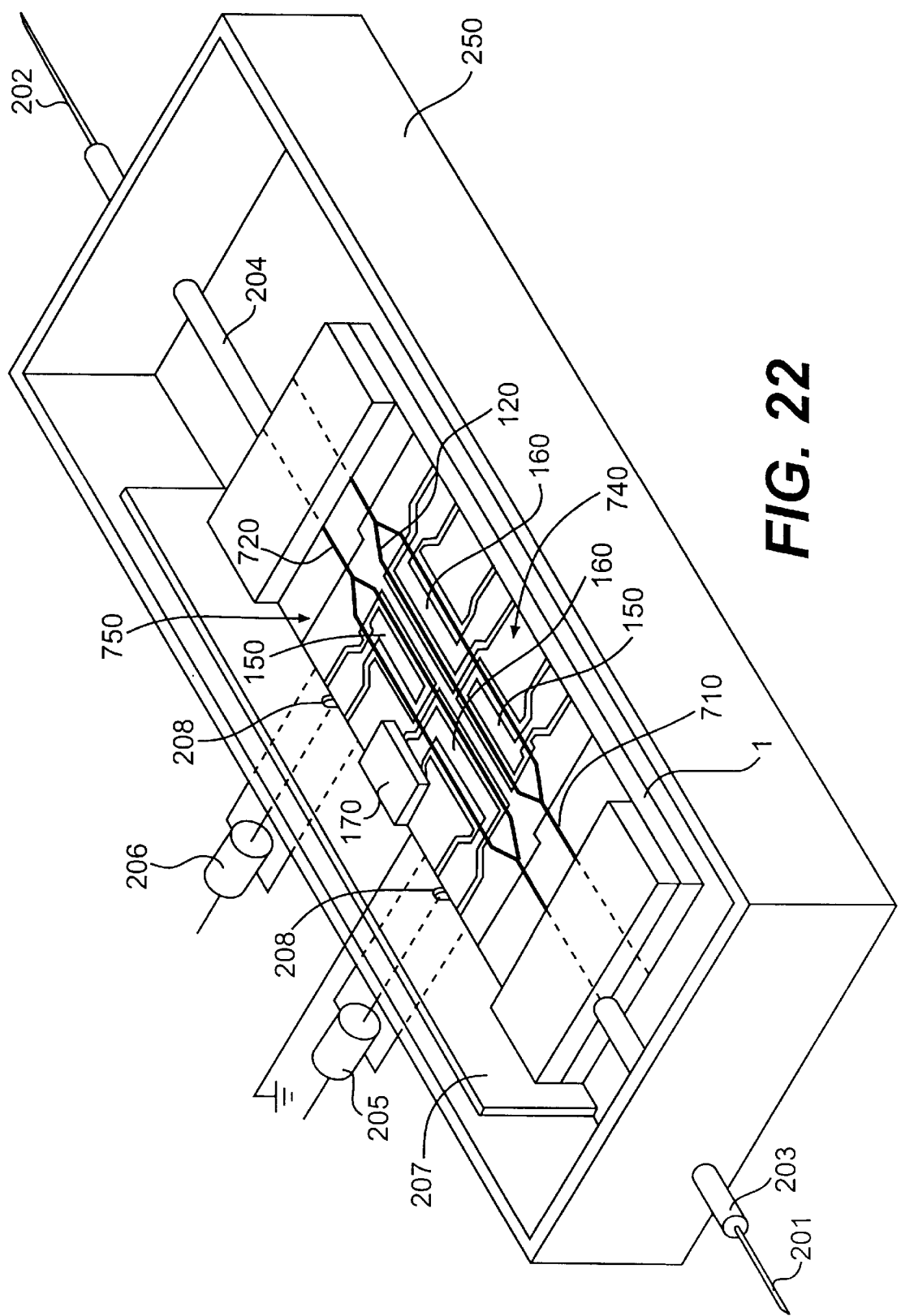

FIGS. 5 to 8 show the successive steps of an example of the process for forming an optical waveguide structure on a crystalline substrate element, comprising the steps of photoexposure of the crystalline substrate to UV rays through a mask (FIG. 5), deposition of titanium (FIG. 6), removal of the excess titanium (FIG. 7) and thermal diffusion of the titanium so as to form the optical structure (FIG. 8);

FIGS. 9 to 12 show the subsequent steps of an example of a process for forming an electrical structure, on a crystalline substrate element carrying an optical structure, comprising exposure to UV rays through an associated mask (FIG. 9), deposition of a resist layer (FIG. 10), galvanic growth of gold (FIG. 11), removal of the resist layer (FIG. 12);

FIGS. 13 to 15 show the arrangement of a plurality of interferometric optical structures on a single device (FIG. 13), a mask for the definition of an electrical structure at a location corresponding to one of the optical structures present on the device (FIG. 14), and one of the possible arrangements involving superimposition of said electrical structure on one of the optical structures of the device, chosen beforehand (FIG. 15);

FIG. 16 shows the arrangement of a pair of interferometric optical structures on a single device;

FIG. 17 shows a mask for the design of a pair of electrical structures on top of the optical structures according to FIG. 16;

FIG. 18 shows the overall arrangement of the electrical structures and the optical structures on the device;

FIG. 19 shows the overall arrangement of the electrical structures and the optical structures in a phase modulator device;

FIG. 20 shows the overall arrangement of the electrical structures and the optical structures in an intensity and phase modulator device;

FIG. 21 shows a general diagram of a system in which an electrooptical modulator device according to the invention may be used;

FIG. 22 shows a perspective view of a modulator device according to the present invention, complete with electrooptical structures, optical connecting fibers and electrical connections, inserted inside its housing.

Figure 1:
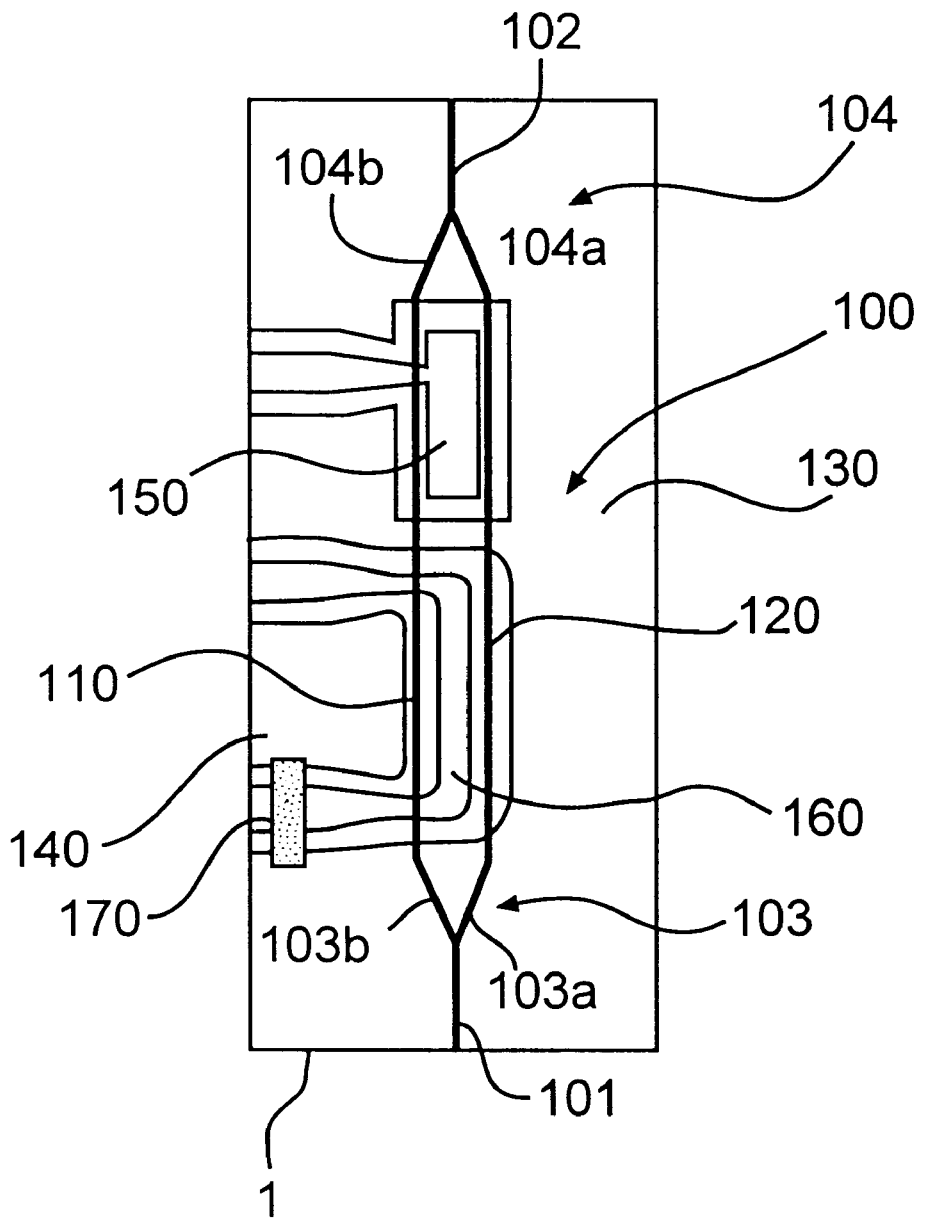
FIG. 1 shows a general diagram of a Mach-Zehnder electrooptical modulator device.

As shown in FIG. 1, a Mach-Zehnder electrooptical interferometric modulator device comprises:

- a portion 1 of crystalline substrate, for example made of lithium niobate; this portion, corresponding to a single device, consists of a unit obtained by means of cutting of a substrate element and is referred to below as "chip";
- an optical structure 100, comprising a first optical waveguide section 101, which is then divided into two branches 110, 120 located alongside one another and joining up again in a second optical waveguide section 102; the optical structure 100 is advantageously obtained by means of diffusion on the crystalline substrate 1 of a substance suitable for varying the refractive index thereof and designed to allow an optical signal to pass through;
- an electrode structure which is arranged between the two branches 110, 120 of the optical structure and which comprises a polarization or bias electrode 150 and a signal (or radiofrequency) electrode 160;
- a pair of ground electrodes 130, 140 arranged outside of the two branches 110, 120 of the optical structure; the signal electrode 160 is connected to the ground electrodes 130, 140 by a resistor termination 170.

In a preferred embodiment, the crystalline substrate is made of lithium niobate ($LiNbO_3$) which allows the formation, on the surface, of monomodal waveguides with low losses, for example using a technology which involves the thermal diffusion of thin films of titanium, defined by photolithographic techniques.

The optical waveguide section 101 is connected to a Y-junction 103 which comprises two diverging branches 103a, 103b connected to the branches 110, 120 located alongside one another.

At the end of the branches 110, 120 located alongside one another there is a second Y-junction 104, comprising two converging branches 104a, 104b which join up and are connected to the output waveguide 102.

Preferably the waveguides forming the portions 101, 102, 103, 104 described above are of the monomodal type.

The signal, bias and ground electrodes 110, 120, 150, 160 are arranged with respect to the waveguides of the branches located alongside one another so as to produce respective electric fields designed to modify, owing to the electrooptical effect, the index of refraction of the waveguides 110, 120; the arrangement described is such that an electric field with the same potential is applied along both the waveguide branches 110, 120 of the optical structure.

The electrooptical effect which is produced when respective electrical signals are applied to the electrodes consists in the variation in the index of refraction of material of the substrate subjected to an electric field.

Crystals without a center of inversion, such as for example lithium niobate mentioned above, are advantageous for this purpose.

Other suitable materials are, for example, $LiTaO_3$ or GaAs or InP (semiconductor type); polymer (thermooptical) materials, or materials of the silica-on-silica or silica-on-silicon type, if necessary polarized, may also be used.

In order to exploit the maximum electrooptical coefficient, the force lines of the field applied should be parallel to the optical axis z of the crystal; if the crystal is cut along this same optical axis ("z-cut" devices), the signal electrode 160 is advantageously arranged on top of the waveguide with which it is to interact; in devices cut along the optical axis x ("x-cut"), in order to maximize the electrooptical interaction with the optical structure, the signal electrodes are advantageously arranged laterally with respect to the optical waveguides with which they must interact.

For manufacture of the modulators, cutting along the optical axis x is preferred since z-cut crystals exhibit marked pyroelectricity and thermal drift phenomena.

In the example shown in the Figure, the crystalline substrate 100 is of the x-cut type.

The Mach-Zehnder modulator device, by means of application of an electric field, allows variation in the refractive index of two portions of the waveguide path, causing a phase-shift between two fractions of an optical signal which is propagated in said portions of the waveguide path in the crystal; this phase-shift is then converted into a variation in amplitude of the signal, by means of interference or evanescent wave coupling.

The injected optical signal which is propagated in the initial waveguide section 101 is divided into two equal parts at the first Y-junction 103; the two signal fractions which are propagated in the waveguides 110, 120 then undergo equal and opposite phase modulation in the central zone and interfere at the second Y-junction 104, combining again in a first symmetrical mode with the components in phase and in a second anti-symmetrical mode with those in phase-opposition. The anti-symmetrical mode is then irradiated in the substrate when the width of the guide diminishes so as to allow propagation of only the fundamental mode.

In a preferred embodiment the radiofrequency electrode 160 is located between the two branches 110, 120 of the optical structure and the ground electrodes 130, 140 are located outside the two branches, so as to create an equal and opposite (push-pull) electrooptical effect on the two guides, halving the drive voltage required.

The theoretical bases of operation of the Mach-Zehnder modulators are described, for example, in "Waveguide Electrooptic Modulators" by R. C. Alferness, IEEE Transactions on Microwave Theory and Techniques, vol. MTT-30, No. 8, August 1982, page 1121, already mentioned.

In a preferred embodiment, in addition to the modulating signal electrode 160, an additional bias electrode 150 is located on the modulator, having the function of compensating for any optical path differences between the two branches 110, 120 of the interferometer, generated during formation or due to external influences during operation, such as for example mechanical and thermal deformations. An electronic feedback circuit regulates the voltage of this electrode in order to compensate for any temporal or thermal drift and in general controls the working conditions of the Mach-Zehnder device in accordance with the requirements for use; an example of a modulator of this kind is described in U.S. Pat. No. 5,359,449.

Figure 2:
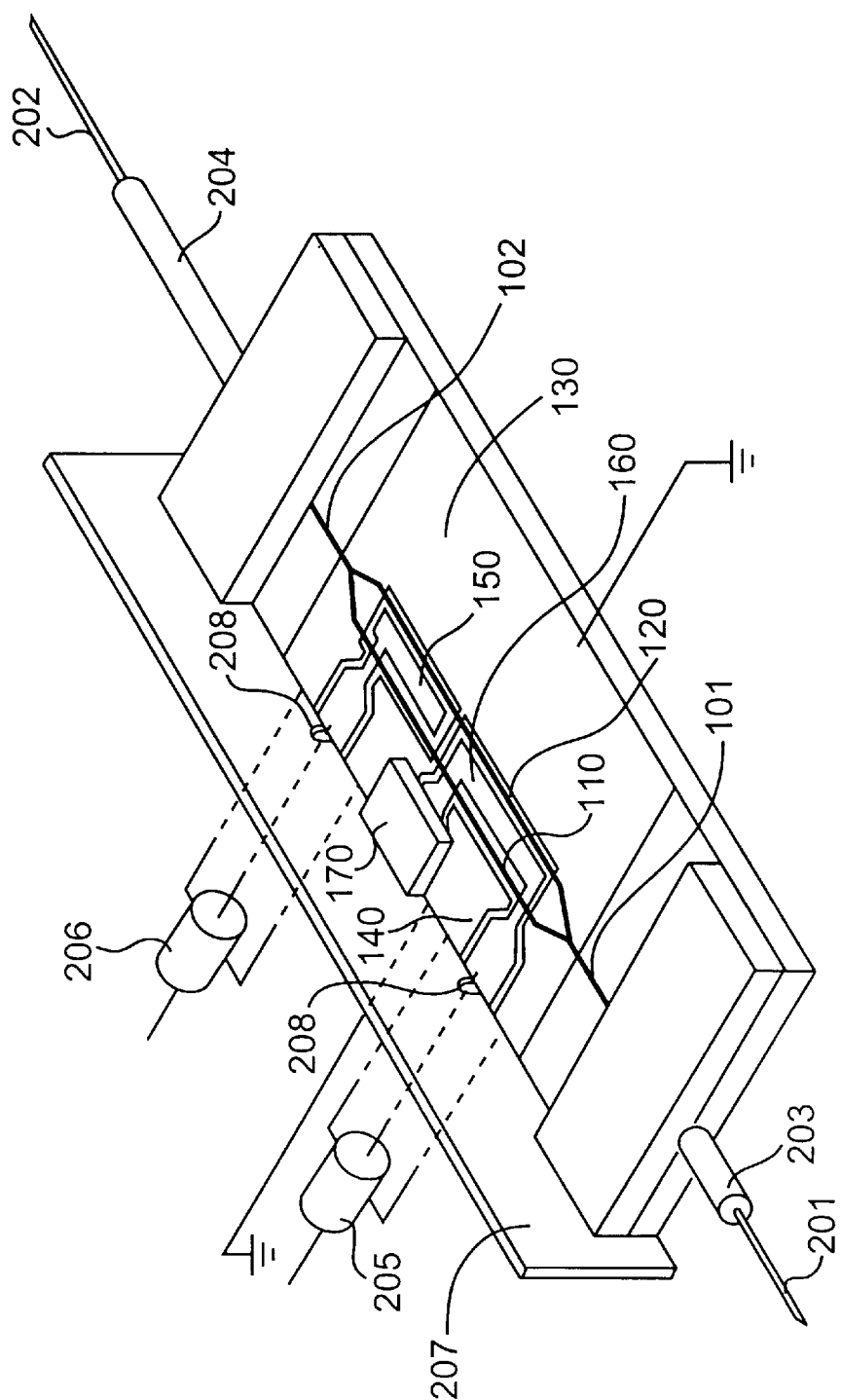
FIG. 2 shows a perspective view of a modulator device, complete with electrooptical structures, optical connecting fibers and electrical connections.

A finished modulator, illustrated in its entirety in FIG. 2, also comprises connecting fibers 201, 22, applied by means of a pig-tailing operation and a support structure, inside which the chip of the device is housed and protected.

Said pig-tailing operation envisages the application of respective fiber-carrying blocks 203, 204 inside which the connecting fibers 201, 202 are housed.

The optical fibers for interconnection of the component described are monomodal 8/125 type fibers, where 8 represents the diameter of the core and 125 represents the diameter of the cladding of the fiber, expressed in $\mu$m.

Preferably, the fiber used at the input 201 is of the bias-maintaining type, for maintaining the optical bias state of the signal; for this purpose it may be advantageously provided with an elliptical core or equivalent optical characteristics, for example the type PANDA 8/125 marketed by FUJIKURA.

The output fiber, for which bias maintenance is generally not required, may be for example the type SMF-FOS 8/125 produced by FOS Fibre Ottiche Sud S.p.A.

The device is then mounted in a housing consisting of a metal support (not illustrated) which advantageously has a ground plane 207 forming part of it and the electrical connections of which are performed by soldering together the radiofrequency signal electrode 160, terminated by means of a resistor termination 170, and a signal connector 205; the bias electrode 150 and a bias connector 206; and the ground electrodes 130, 140 and the ground plane 207, using a conductive adhesive or solder.

The longitudinal distances between the edges of the device and the terminations of the electrodes strictly determine the characteristics of the housing of the device in the equipment for which it is intended and these should conveniently satisfy predetermined parameters.

For example, the ground plane 207 has holes 208, opposite the terminations 150, 160, so as to allow the fixing of the connectors 205, 206 on the side 210 of the device in contact with the ground plane 207.

During the pig-tailing process the position of the electrical terminations poses limitations on the system used for fixing the fibers since, during the process, it is advantageous to apply a bias voltage to the modulator in order to check the optical alignment thereof (compensating for any non-ideal features of the structure formed).

Figure 3:
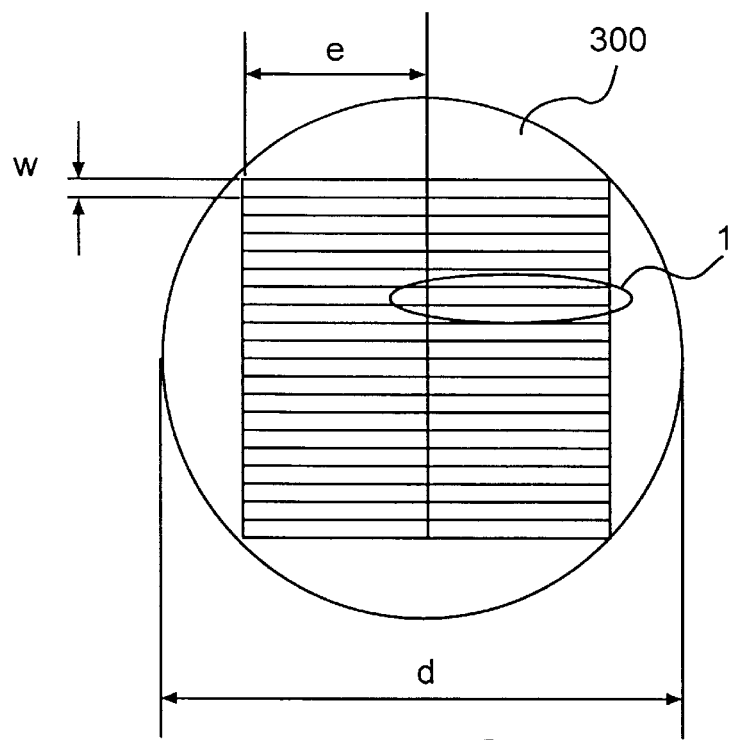
FIG. 3 shows an example of the arrangement of several devices on two columns in a crystalline substrate element.

FIG. 3 shows a crystalline substrate element 300, also called wafer, in which there are formed about 40 units 1 (from which the chips are obtained), each corresponding to a device described above.

These chips typically have a length "l" of the order of 40 mm and width "w" of 2 mm and are formed in a wafer of diameter "d" of about 3 inches (76.2 mm) and 0.04 inches (about 1 mm) of thickness (size commercially available).

For example, a crystalline substrate made of lithium niobate of about 76.2 mm diameter and 1 mm thickness, of the "Optical Grade" type, is marketed by the company Crystal Technologies or by others.

The size of the chips, and hence the total maximum number of devices which can be made from a wafer, is subject to limitations due, among other things, to the fragility of the material, which would make a chip of width significantly less than that indicated, prone to breakages.

The length of the device, and hence that of the chip on which it is formed, is dependent, moreover, upon the formation of an effective electrooptical interaction; typically, an effective length of interaction suitable for the examples indicated is of the order of a few millimeters, preferably of the order of at least ten or so millimeters.

For formation of the device, making the most efficient use of the wafer available, the minimum longitudinal and transverse dimension of the chip required is therefore defined and, on the basis thereof, the maximum number of units possible on the surface of the wafer is designed.

This design also takes account of the quantity of material which is lost in the operations involving cutting of the individual chips.

Figure 4:
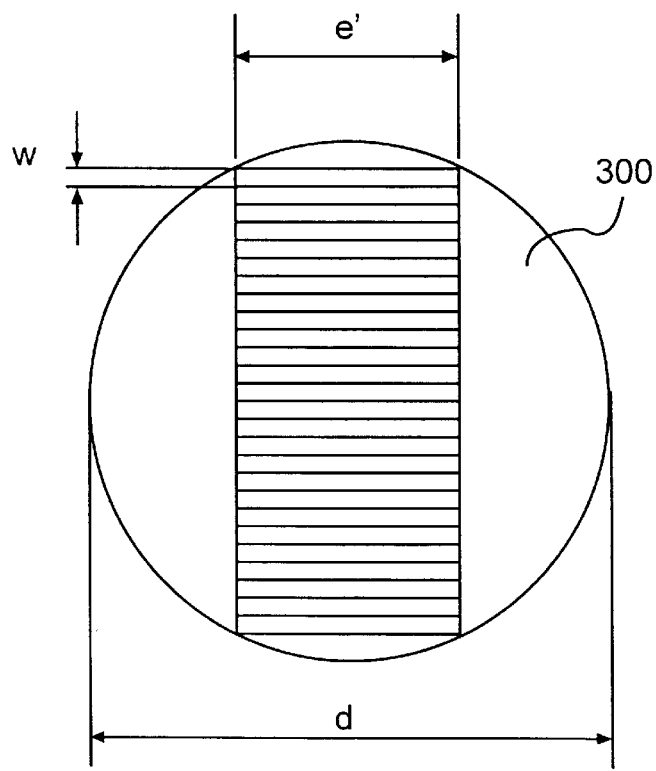
FIG. 4 shows an example of the arrangement of several devices on a single column in a crystalline substrate element.

FIG. 4 shows an alternative arrangement of the units in the wafer 300, from which the chips are obtained, comprising about 25 units having the same width "w" of 2 mm and length "l" of 50 mm, as required in the case where a greater length of electrooptical interaction is advantageous or it is desired to form several integrated functions in the same device.

A technique for forming the devices described above from a wafer of crystalline substrate is described with reference to FIGS. 5 to 8 as regards the optical part and 9 to 12 as regards the electrical part.

Figure 5:
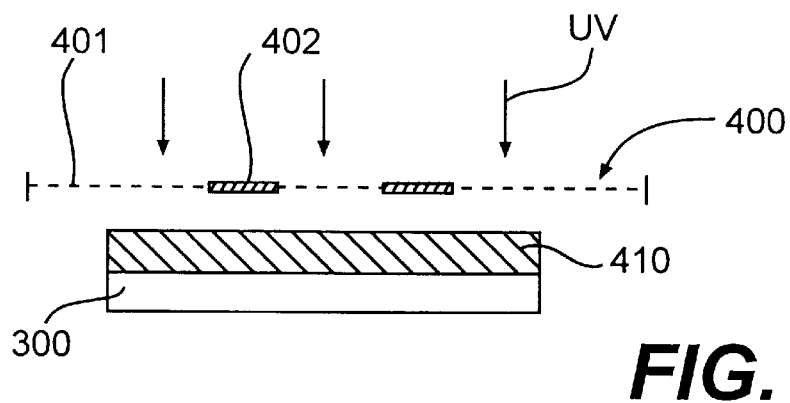

As shown schematically in FIG. 5, the wafer 300 of crystalline substrate is covered by a layer of photosensitive material 410, referred to below as "photoresist", which is sensitive to ultraviolet light, as illustrated in FIG. 5 and above it there is aligned a mask 400.

The mask 400, for example made of quartz, is formed for example by means of a photolithographic process comprising the following steps:

depositing a layer of photosensitive material ("photoresist") on a quartz sheet which has been covered beforehand with chromium;

selectively impressing the layer of photosensitive material ("photoresist") by means of an electron beam which defines the design of the planned structures;

removing the photosensitive layer from the zone where impression has not occurred;

chemically etching the layer of chromium left exposed;
removing the residual photosensitive material.

The mask 400 thus formed, provided with the design for definition of the optical waveguide structures for all the chips to be obtained from the wafer, is superimposed on and aligned with the wafer of crystalline substrate 300.

In the simplified diagram shown in the Figures, this mask has a first plurality of zones 401, transparent with respect to UV rays, and a second plurality of zones 402, opaque with respect to UV rays.

This mask has moreover suitable reference points which allow the impression, on the crystalline substrate, of reference marks 610, shown in FIGS. 13, 16, for the subsequent corresponding alignment of a mask for definition of the electrical structures, described below.

The process used for definition of the guides using a mask is of the photolithographic type.

The wafer of the crystalline substrate 300 lined with photoresist and covered by the mask is subjected to exposure to the ultraviolet rays.

The zones of photoresist 410 not imprinted are then chemically removed, by forming openings in the photoresist at locations corresponding to the intended waveguide paths.

As shown in FIG. 6, deposition, by means of sputtering, of a layer 430 of titanium over the entire surface is then performed, and the remaining photoresist is then eliminated (lifted off), together with the titanium deposited on it, leaving the titanium 430 in the desired positions only (FIG. 7).

Finally, as shown in FIG. 8, the crystalline substrate 300 is placed in an oven, at a temperature of about 1030° C. for 9 hours, so that the diffusion of the titanium in the substrate forms the waveguides 440, modifying locally the index of refraction of the crystalline substrate 300 itself.

In the case where doped waveguides, for example containing rare earths, are required, as a first step in the process, deposition, over the entire crystalline substrate, of a layer of rare earth (for example erbium) followed by oven-diffusion (for example at 1100° C. for 100 hours) may be performed.

Alternatively, the definition of an optical structure may be obtained, for example, using a proton exchange process, not shown in the figures.

This process comprises the steps of:
covering the crystalline substrate with photoresist,
aligning a mask having a design with portions which are transparent and opaque with respect to ultraviolet rays, on the crystalline substrate,
exposing the crystalline substrate to ultraviolet rays,
chemically removing the photoresist exposed to ultraviolet rays,
immersing the crystalline substrate in a solution of benzoic acid, and
chemically removing the residual photoresist.

An example of a process performed for the formation of the electrical structures is now described, with reference to FIGS. 9 to 12.

With a process similar to that described above, a mask 500 is formed, said mask having a first plurality of zones 501 transparent with respect to UV rays and a second plurality of zones 502 opaque with respect to UV rays and designed to define the desired geometry of the electrodes.

A thin layer 510 of titanium and a layer 520 of gold is deposited on the crystalline substrate 300 on which the optical waveguides have already been formed (only one is shown in the figures); a layer of photosensitive material 410 is then deposited.

Optionally, an insulating layer of silicon monoxide is deposited over the entire surface of the crystalline substrate, underneath the layers of titanium and gold, in order to avoid excessive optical losses due to absorption by the metal.

Figure 9:
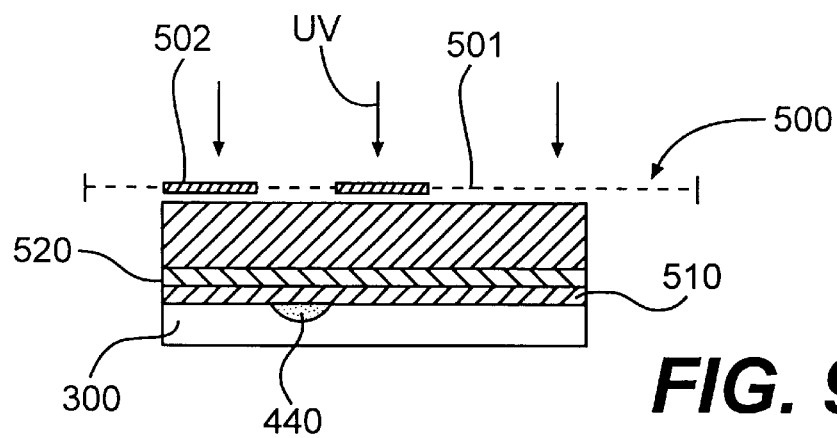
Figure 10:
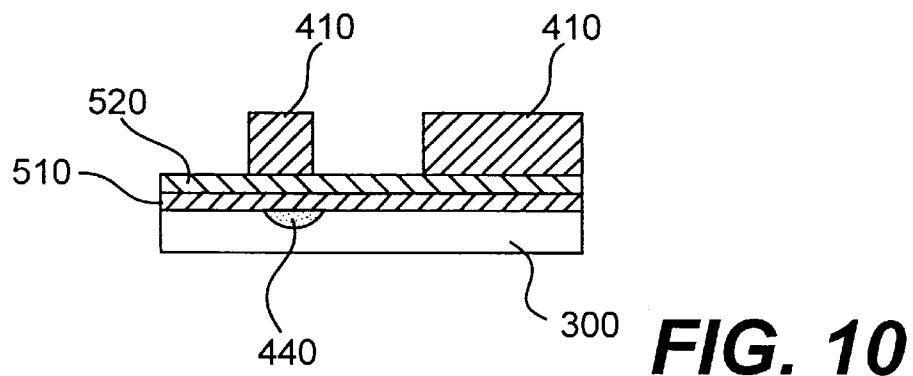

The mask 500 is arranged on top of the crystalline substrate 300, aligned with extreme precision (±0.25 μm) opposite the optical structure, by means of the reference points 610 already mentioned; the whole assembly is then exposed to the UV rays through the mask, as shown in FIG. 9.

Subsequently, the photosensitive material 410 not exposed is chemically removed, in a similar manner to that described above and as illustrated in FIG. 10, leaving exposed the zones corresponding to the electrodes.

Then, as shown in FIG. 11, galvanic growth of the electrodes in a gold bath is performed, depositing a layer of gold 530 in the zones where the photoresist has been removed, until the desired thickness is reached.

Finally, by means of chemical etching, the residual photoresist and the thin initial layer of titanium and gold not grown galvanically is removed so as to obtain the final structure schematically shown in FIG. 12.

Following the operations described above, the crystalline substrate 300 on which the optical and electrical structures are present is cut along the points corresponding to the individual units so as to form the chips 1.

Cutting is performed, for example, by means of a circular saw with a diamond-coated blade, driven by a numerical-control machine, so as to ensure parallel alignment between the cutting surfaces and the direction of the optical guides. Prior to cutting, the crystalline substrate is advantageously protected with a layer of photoresist, so as to avoid damage to the surfaces.

The ends of the chips thus obtained are then subjected to a lapping process, so as to obtain faces which are perfectly flat and have the desired optical finishing quality.

During this step, several chips are bound together in a bundle, alternating chips with complete optical and electrical structures and plain unprocessed lithium niobate blanks, using a low-melting wax. The bundle is mounted on a support, able to exert a suitable pressure between the surfaces to be smoothed and a rotating plate, on which a solution comprising a granular adhesive is applied in the form of droplets. As a result of the subsequent smoothing operations, using granules with an average diameter 3 and 0.1 μm respectively, perfectly flat surfaces may be obtained, whereby the quality of said surfaces may be checked under a microscope by means of interferometric measurements.

All the processing steps require a perfectly clean environment and are preferably performed in "aseptic chambers" with a controlled dust level.

In order to perform pig-tailing, two fiber-carrying blocks 203, 204, in which the connecting fibers 201, 202 are housed, are arranged in the vicinity of the end waveguides 101, 102 of the optical structure 100 of the chip; an optical alignment check is then performed in order to maximize the optical power transmitted and reduce the insertion losses; a typical loss, for example in the case of an analog modulator, is of the order of 3.5 dB. After checking the optimum alignment, the fiber-carrying blocks 203, 204 and the optical fibers 201, 202 are fixed to the chip in the prechosen position by means of a transparent adhesive.

The device provided with the optical connecting fibers is then fixed onto a metal support and the ground electrodes are connected, for example by means of a conductive adhesive, to the ground plane 207; the electrical connectors are soldered to the respective terminations of the electrodes of the device and the radiofrequency electrode 160 is connected by means of the resistive termination 170 to the ground electrode. Finally the entire assembly is housed inside a protective casing, not illustrated.

The devices produced in accordance with that described above are then subjected to a testing and analysis procedure.

In order to verify the quality of the optical structures, the transmission loss across two facing optical fibers at the end of the device and an optical power measuring device is measured; the typical loss for an analog modulator is about 3.5 dB.

In order to verify the quality of the electrodes, an electric multimeter is used for measuring the resistance, checking that the values measured coincide with the predefined values, within the scope of a predefined tolerance for example of the order of ±0.5 Ohm.

In order to qualify the performance characteristics of an electrooptical modulator, the following parameters are usually measured:

modulation band, having as wide an amplitude as possible in order to transmit a high number of basic information elements (bits) per unit of time;

insertion loss, measured in dB, which represents attenuation of the optical signal over the entire device (fiber-fiber) and which must be contained in order to avoid the need for subsequent amplifications, capable of introducing excess noise;

on/off voltage, which provides the voltage necessary for passing from a constructive interference condition to a destructive interference condition; and band ripple for a measurement of the irregularity in the modulation amplitude.

Devices of the type described and illustrated above have been manufactured by the Applicant with the following methods.

During manufacture of the devices, the condition relating to an arrangement of the electrodes which would allow correct housing and interfacing of the device with the external equipment, observing the predefined positions for the optical and electrical connections, has been observed.

EXAMPLE 1

With the process described above, several units were formed on a wafer of substrate, as illustrated in FIG. 13, each having several optical structures (three in particular, denoted (in the figure) by 100a, 100b, 100c; corresponding alignment reference points 610a, 610b, 610c are formed opposite these optical structures.

The optical structures of the units present on the wafer are then examined under a microscope in order to select from them the optical structures devoid of defects; then, a common alignment position is prechosen, corresponding to one of the three reference points 610, where there is the least number of defects in all the units considered (i.e. on the whole wafer).

In this position, the arrangement of a mask 630 for the formation of the electrical structures (the design of which, for a single unit, is illustrated in FIG. 14) is determined; for this purpose the mask 630 has a locating element 620 designed to be arranged in alignment with one of the reference points 610 of the optical structures.

In this way complete units are formed on the substrate wafer, as illustrated schematically in FIG. 15, from which the chips are then obtained in order to form the individual devices.

EXAMPLE 2

Modulator devices of the type described have also been produced with the following methods.

With the process described above, several units were formed on a wafer of substrate, one of which is illustrated in FIG. 16, each provided with a pair of optical structures 710, 720, each comprising two parallel or substantially parallel branches 110, 120 and an alignment reference point 610.

The optical structures 710, 720 are symmetrical with respect to a rotation of 180° about an axis perpendicular to the surface of the unit, passing in an intermediate position between the optical structures themselves.

A mask for forming the electrical structures of the various units is then directly arranged on the optical structures thus provided; the configuration of the mask, for a single unit only, is illustrated in FIG. 17, denoted by the reference number 730.

This mask has a design designed to form a pair of electrical structures 740, 750, each comprising a ground electrode 130, signal electrode 160 and bias electrode 150, which are symmetrical with respect to a rotation of 180° about the same axis of symmetry of the optical structures, and an alignment locating element 620 designed to be tallied with the reference point 610.

By means of this mask an electric structure has thus been provided opposite to and in alignment with each of the optical structures present on the individual units, as illustrated in FIG. 18.

Subsequently the wafer of crystalline substrate 300 was then cut by separating the units so as to obtain the desired chips and the faces of the devices obtained were then smoothed; the optical characteristics of the electrooptical structures formed by joining together of the optical structures and the electrical structures produced were then analyzed.

On the basis of this analysis, for each device, one of the two pairs of electrooptical structures present on the chip showing, upon said analysis, improved values compared to a predetermined limit was chosen, and the device was oriented so as to allow connection of the preselected electrooptical structure to the electric contacts 205, 206 and to the incoming and outgoing optical fibers 201, 202 of the device in the housing provided.

A modulator device formed in accordance with example 2 is shown in its entirety in FIG. 22, in which the various components are denoted by the same reference numbers already used; the device is inserted inside a container 250, preferably made of metal, having openings through which the electric contacts 205, 206 and the optical connecting fibers 201, 202 emerge externally.

As can be seen from the Figure, one of the electrooptical assemblies formed by a pair of electrical and optical structures present on the chip is used and is connected electrically and optically, whereas the other one remains unused; on the basis of the assembly chosen, the orientation of the chip is selected and in this way the relative positions of the electrical connections and the optical connections remain unaltered, independently of the prechosen pair.

This thus allows assembly of the device in the equipment for which it is intended, independently of the pair of electrooptical structures selected.

The Applicant then assessed the rejects produced following the two methods described: having called n the number of devices per crystalline substrate x the percentage of defective optical structures y the percentage of defective electrical structures a calculation was performed, from the binomial distribution, of the probability of having m optical rejects for a particular alignment between optical structures and electrical structure:

$$P_m = \frac{1}{m!(n-m)!} \cdot x \cdot (1-x)$$

and the total probability of having at least one optical reject for an alignment:

$$P_{tot} = \sum_{m=1} P_m$$

In the case of Example 1, in which three alignments are possible, the probability of having an optical reject on a crystalline substrate is defined by $P_{tot}^3$, and hence the percentage of optical rejects is $P_{tot}^3/n$.

Adding to this value the defectiveness of the electrodes, the percentage of optical/electrical rejects is:

$$S_{tot} = \frac{P_{tot}}{n} + y - \frac{P_{tot}}{n} \cdot y$$

In the case of Example 2, there is rejection of a device only if both the optical guides or both the electrical structures or an optical structure and the opposite electrical structure are defective; in analytical terms:

$$S_{tot} = x^2 + y^2 + 2xy(1-x)(1-y).$$

From a numerical point of view, for x=y=10% and n=11, the percentage of rejects with the method described in the first example is 12.9%, whereas with the method described in the second example it is 3.6%.

Moreover, in contrast with the technique of Example 1, operating in accordance with Example 2 results in elimination of the step involving examination under a microscope of the optical structures for selection of the set of optical structures present on the substrate which has the least number of defects, thus making the method more reliable and reducing the time necessary for carrying out thereof.

It is noted, moreover, that the formation of only two optical structures on a single unit enables chips of limited width to be formed, while maintaining a high production output, without having to resort to the formation of a considerable number of optical and electrical structures on a single unit, from which the configuration with the least defects is chosen.

The symmetrical arrangement of the optical structures and the electrodes on the units described in Example 2 is preferable, in order to maintain the same relative arrangement for both the possible configurations of the device which may be selected during the final test prior to the formation of the electrical and optical connections, thus allowing the assembly of the device in the equipment for which it is intended independently of the prechosen pair of electrical and optical structures.

In the case where this condition is not critical, for example for equipment which involves the connection of the electrodes by means of wires (wire bonding), the length and arrangement of which is not rigidly defined, the requirement for symmetry may be dispensed with.

FIG. 19 illustrates the arrangement of the electrical structures 910, 920 and the optical structures 930, 940, according to the invention, in a different device, in particular a phase modulator; for this device also, a substantial reduction in rejects is obtained forming the optical structures and electrical structures, without intermediate checks, and selecting for each device the correct pair during final checking.

FIG. 20, moreover, shows the integrated structure of an amplitude modulator and a phase modulator, combined in the same chip and formed by means of the process according to the invention; in this figure the various components present have been indicated with the same reference numbers used before.

FIG. 21 shows an example of equipment in which the integrated optical device manufactured in accordance with the invention may be used.

The figure shows a wavelength converter, designed in particular for conversion of a modulated optical signal 800 supplied at the input, having a wavelength λ1, into a modulated optical signal 809 with a wavelength λ2, emitted at the output.

The equipment comprises a receiving photodiode 802, which receives the optical signal 800 and converts it into a modulated electrical signal, which is sent by the electronic amplifier 803, where it is amplified, and from which it is supplied to the radiofrequency signal connector 806 of an electrooptical modulator 805, suitably constructed according to the invention.

The modulator 805 performs the consequent optical modulation of the continuous light signal 807 with a wavelength λ2 received from the laser source 804, and emits a modulated optical signal 809. Part of the modulated optical signal 809 with a wavelength λ2 provided by the modulator via a directional coupler 810 is sent to the control circuit 808, which is connected to the connector 811 for biasing the modulator 805 and performs stabilization of the operating point of the modulator 805 itself.

By way of conclusion, the production of devices according to Example 2 allows a reduction in the processing time for a wafer owing to elimination of examination, under a microscopic, of the optical guides and an in increase in the efficiency of the process with a reduction in the cost and the production time, without involving any modification during the manufacturing and assembly process.

The embodiments described may be subject to variations, modifications and replacements by the person skilled in the art, which fall within the scope and spirit of the invention, such as for example the formation of other electrooptical devices comprising on a single substrate additional optical and electrical structures interacting with one another, such as, for example, filters or lasers.

We claim:

1. A process for the manufacture of electrooptical components, in which an optical structure and an electrical structure are formed on a substrate, characterized in that it comprises the steps of:

defining geometrically at least one unit on an element of said substrate, said unit corresponding to a single component;

forming at least two optical structures with an optical waveguide on said unit;

forming an electrical structure for each of the said optical structures on said unit, providing an electrooptical assembly comprising an optical structure and an electrical structure which can be operationally associated with one other;

separating said unit from said substrate element;

analyzing the functional characteristics of each of said electrooptical assemblies in said units; and selecting one of said electrooptical assemblies demonstrating, upon analysis, improved values compared to a predetermined limit of at least one of said functional characteristics.

2. Method for manufacturing electrooptical components according to claim 1, characterized in that a plurality of units are defined on said substrate element.

3. Method for manufacturing electrooptical components according to claim 1, characterized in that each of said electrical structures comprises at least one ground electrode and one signal electrode.

4. Method for manufacturing electrooptical components according to claim 2, characterized in that two of said electrical structures on the same unit have a common ground electrode.

5. Method according to claim 1, characterized in that said substrate is made of a material chosen from LiNbO$_3$, LiTaO$_3$, GaAs, InP, Si, SiO$_2$ and a polymer material with low optical attenuation.

6. Method according to claim 5, characterized in that said substrate is made of LiNbO$_3$.

7. Method according to claim 1, characterized in that said electrooptical assembly comprises a Mach-Zehnder interferometric structure.

8. Method according to claim 1, characterized in that said step of forming at least two optical structures with an optical waveguide on said unit comprises forming at least two optical waveguides in said substrate by means of photolithography through a mask for optical structures.

9. Method according to claim 8, characterized in that said optical waveguides are formed by means of diffusion of titanium.

10. Method according to claim 8, characterized in that said optical waveguides are formed by means of proton exchange.

11. Method according to claim 1, characterized in that said step involving forming at least one electrical structure for each of said optical structures on said unit comprises forming at least one electrode on said substrate by means of deposition of a conductive metal layer by means of photolithography through a mask for electrical structures.

12. Method according to claim 1, characterized in that said electrical structures have ends accessible for the supplying of electrical signals by means of electrical contact, being aligned on one side of said unit, and said optical waveguides have at least one end accessible for the supplying of optical signals by means of optical coupling, said accessible ends of each electrooptical assembly being in a predefined relative position.

13. Method according to claim 11, characterized in that it comprises forming on each unit two independent and opposite electrooptical assemblies having a symmetry with respect to a rotation of 180° about the central axis perpendicular to the surface of the unit, each having ends of the electrical structures arranged on one side of the device, so that they may be connected to a plurality of external connectors.

14. Electrooptical component comprising:
   a substrate,
   at least one optical waveguide structure on said substrate designed to allow the passage of an optical signal,
   at least one electrical structure comprising a plurality of electrodes located in the vicinity of and operationally associated with said optical waveguide structure, designed to receive an external electrical signal, characterized in that it comprises at least two electrooptical assemblies formed by an optical structure and an electrical structure which are operationally associated with one another.

15. Electrooptical component according to claim 14, characterized in that each of said electrical structures comprises at least one ground electrode and one signal electrode.

16. Electrooptical component according to claim 15, characterized in that each of said electrical structures comprises additionally a phase electrode.

17. Electrooptical component according to claim 14, characterized in that two of said electrical structures on the same unit have a common ground electrode.

18. Electrooptical component according to claim 14, characterized in that said substrate is a crystalline substrate.

19. Electrooptical component according to claim 18, characterized in that said crystalline substrate is a birefringent electrooptical material.

20. Electrooptical component according to claim 14, characterized in that said substrate is made of a material chosen from LiNbO$_3$, LiTaO$_3$, GaAs, InP, Si, SiO$_2$ and a polymer material with low optical attenuation.

21. Electrooptical component according to claim 20, characterized in that said substrate is made of LiNbO$_3$.

22. Electrooptical component according to claim 14, characterized in that said electrical structures have ends accessible for the supplying of electrical signals by means of electric contact, being aligned on one side of said unit, and said optical waveguides have at least one end accessible for the supplying of optical signals by means of optical coupling, said accessible ends of each electrooptical assembly being in a predefined relative position.

23. Electrooptical component according to claim 14, characterized in that it comprises two independent and opposite electrooptical assemblies having a symmetry with respect to a rotation of 180° about the central axis perpendicular to the surface of the unit, each having ends of the electrical structures arranged on one side of the device, so that they may be connected to a plurality of external connectors.

24. Electrooptical component according to claim 14, characterized in that said electrooptical assembly comprises a Mach-Zehnder interferometric structure.

25. Electrooptical component according to claim 14, characterized in that it is an electrooptical modulator device, in which said signal electrodes comprise a bias electrode and a drive electrode designed to receive a radiofrequency signal for driving of the modulator.

26. Electrooptical component according to claim 14, characterized in that it is an interferometric electrooptical modulator device which comprises at least two independent electrooptical assemblies, each comprising at least one optical structure and at least one electrical structure which are operationally connected, said electrical structure including at least one signal electrode and at least one ground electrode, where each of said electrical structures has ends arranged on a respective side of the device in predetermined positions with respect to said side, a predetermined angle of rotation of the device being defined such that said ends of two electrooptical assemblies are arranged in the same predetermined positions.

27. Electrooptical component according to claim 16, characterized in that it is an interferometric electrooptical modulator device comprising a first and a second Mach-Zehnder structure comprising pairs formed by said optical structure and by said electrical structure, being located opposite one another and symmetrical with respect to an axis passing through the surface of the device, forming two independent electrooptical modulators having a symmetry with respect to a rotation of 180° about said axis, each modulator having ends of the electrical structures arranged on one side of the device so that they may be connected to respective external connectors, where by means of a first or a second rotation of 180° of the device said first or said second modulator is respectively connected to said connectors.

* * * * *

UNITED STATES PATENT AND TRADEMARK OFFICE
CERTIFICATE OF CORRECTION

PATENT NO. : 5,999,667
DATED : 12/7/99
INVENTOR(S) : Andrea Castoldi et al.

It is certified that error appears in the above-identified patent and that said Letters Patent is hereby corrected as shown below:

Column 15, line 17, change "and" to --or--

Column 16, line 20, change "and" to --or--

Column 18, line 2, change "where by" to --whereby--.

Signed and Sealed this

Sixth Day of June, 2000

*Attest:*

Q. TODD DICKINSON

*Attesting Officer*    *Director of Patents and Trademarks*